(12) United States Patent
Andrady et al.

(10) Patent No.: US 7,134,857 B2
(45) Date of Patent: Nov. 14, 2006

(54) ELECTROSPINNING OF FIBERS USING A ROTATABLE SPRAY HEAD

(75) Inventors: Anthony L. Andrady, Apex, NC (US); David S. Ensor, Chapel Hill, NC (US); Randall J. Newsome, Apex, NC (US)

(73) Assignee: Research Triangle Institute, Research Triangle Park, NC (US)

(*) Notice: Subject to any disclaimer, the term of this patent is extended or adjusted under 35 U.S.C. 154(b) by 77 days.

(21) Appl. No.: 10/819,916

(22) Filed: Apr. 8, 2004

(65) Prior Publication Data

US 2006/0228435 A1    Oct. 12, 2006

(51) Int. Cl.
*B32B 27/12* (2006.01)

(52) U.S. Cl. .......... 425/66; 425/174.8 E; 425/174.8 R; 425/382.2

(58) Field of Classification Search ............... 425/66, 425/174.8 E, 174.8 R, 382.2, 382.3, 464
See application file for complete search history.

(56) References Cited

U.S. PATENT DOCUMENTS

| | | |
|---|---|---|
| 705,691 A | 7/1902 | Morton |
| 1,975,504 A | 10/1934 | Formhals |
| 2,048,651 A | 7/1936 | Norton |
| 2,160,962 A | 6/1939 | Formhals |
| 2,187,306 A | 1/1940 | Formhals |
| 2,323,025 A | 6/1943 | Formhals |
| 2,349,950 A * | 5/1944 | Formhals ............... 264/10 |
| 3,280,229 A | 10/1966 | Simons |
| 3,475,198 A * | 10/1969 | Drum ..................... 427/482 |
| 3,490,115 A | 1/1970 | Owens et al. |
| 3,670,486 A | 6/1972 | Murray, Jr. |
| 3,901,012 A | 8/1975 | Safar |
| 3,994,258 A | 11/1976 | Simm |
| 4,044,404 A | 8/1977 | Martin et al. |
| 4,127,706 A | 11/1978 | Martin et al. |
| 4,230,650 A | 10/1980 | Guignard |
| 4,323,525 A | 4/1982 | Bornat |
| 4,345,414 A | 8/1982 | Bornat et al. |
| 4,468,922 A | 9/1984 | McCrady et al. |
| 4,552,707 A | 11/1985 | How |

(Continued)

FOREIGN PATENT DOCUMENTS

EP    1 217 107 A1    6/2002

(Continued)

*Primary Examiner*—Joseph S. Del Sole
(74) *Attorney, Agent, or Firm*—Oblon, Spivak, McClelland, Maier & Neustadt, P.C.

(57) ABSTRACT

Apparatus and method for electrospinning fibers in which the apparatus includes a spray head having a longitudinal axis and including at least one electrospinning element disposed in a peripheral wall of the spray head surrounding the longitudinal axis. The electrospinning element includes a passage by which a substance from which the fibers are to be electrospun is provided to a tip of the extrusion electrospinning element. The electrospinning element extends from the peripheral wall in a direction from the longitudinal axis and is configured to electrospin the fibers by electric field extraction of the substance from the tip of the extrusion electrospinning element. Accordingly, the method includes providing a substance from which the fibers are to be composed to a tip of an electrospinning element in a peripheral wall of a spray head having a longitudinal axis, rotating the spray head or a collector configured to receive the fibers around the longitudinal axis, applying in a direction from the longitudinal axis of the spray head an electric field to the tip of the electrospinning element to electrospin by electric field extraction the substance from the tip of the electrospinning element to form the fibers, and collecting the fibers on the collector.

40 Claims, 10 Drawing Sheets

U.S. PATENT DOCUMENTS

| | | | |
|---|---|---|---|
| 4,618,524 A | 10/1986 | Groitzsch et al. | |
| 4,650,506 A * | 3/1987 | Barris et al. | 55/487 |
| 4,689,186 A | 8/1987 | Bornat | |
| 4,878,908 A | 11/1989 | Martin et al. | |
| 4,965,110 A | 10/1990 | Berry | |
| 5,024,789 A | 6/1991 | Berry | |
| 5,088,807 A | 2/1992 | Waters et al. | |
| 5,522,879 A | 6/1996 | Scopelianos | |
| 5,807,436 A * | 9/1998 | Stachelhaus et al. | 118/627 |
| 5,866,217 A | 2/1999 | Stenoien et al. | |
| 6,099,960 A | 8/2000 | Tennent et al. | |
| 6,106,913 A | 8/2000 | Scardino et al. | |
| 6,110,590 A | 8/2000 | Zarkoob et al. | |
| 6,265,333 B1 | 7/2001 | Dzenis et al. | |
| 6,265,466 B1 | 7/2001 | Glatkowski et al. | |
| 6,306,424 B1 | 10/2001 | Vyakarnam et al. | |
| 6,308,509 B1 | 10/2001 | Scardino et al. | |
| 6,375,886 B1 | 4/2002 | Angadjivand et al. | |
| 6,382,526 B1 | 5/2002 | Reneker et al. | |
| 6,395,046 B1 | 5/2002 | Emig et al. | |
| 6,486,379 B1 | 11/2002 | Chen et al. | |
| 6,492,574 B1 | 12/2002 | Chen et al. | |
| 6,520,425 B1 | 2/2003 | Reneker | |
| 6,554,881 B1 | 4/2003 | Healey | |
| 6,558,422 B1 | 5/2003 | Baker et al. | |
| 2001/0045547 A1 | 11/2001 | Senecal et al. | |
| 2002/0007869 A1 | 1/2002 | Pui et al. | |
| 2002/0042128 A1 | 4/2002 | Bowlin et al. | |
| 2002/0084178 A1 | 7/2002 | Dubson et al. | |
| 2002/0090725 A1 | 7/2002 | Simpson et al. | |
| 2002/0100725 A1 | 8/2002 | Lee et al. | |
| 2002/0122840 A1 | 9/2002 | Lee et al. | |
| 2002/0124953 A1 | 9/2002 | Sennett et al. | |
| 2002/0128680 A1 | 9/2002 | Pavlovic | |
| 2002/0150669 A1 | 10/2002 | Pui et al. | |
| 2002/0173213 A1 | 11/2002 | Chu et al. | |
| 2002/0175449 A1 | 11/2002 | Chu et al. | |
| 2003/0017208 A1 | 1/2003 | Ignatious et al. | |
| 2003/0054035 A1 | 3/2003 | Chu et al. | |
| 2003/0100944 A1 | 5/2003 | Laksin et al. | |
| 2003/0106294 A1 | 6/2003 | Chung et al. | |

FOREIGN PATENT DOCUMENTS

| | | |
|---|---|---|
| EP | 1 226 795 A2 | 7/2002 |
| EP | 1 277 857 A1 | 1/2003 |
| JP | 2002-201559 | 7/2002 |
| JP | 2002-249966 | 9/2002 |
| WO | WO 98/03267 | 1/1998 |
| WO | WO 01/15754 A1 | 3/2001 |
| WO | WO 01/26610 A1 | 4/2001 |
| WO | WO 01/26702 A2 | 4/2001 |
| WO | WO 01/27365 A1 | 4/2001 |
| WO | WO 01/27368 A1 | 4/2001 |
| WO | WO 01/51690 A1 | 7/2001 |
| WO | WO 01/68228 A1 | 9/2001 |
| WO | WO 01/74431 A2 | 10/2001 |
| WO | WO 01/89022 A1 | 11/2001 |
| WO | WO 01/89023 A1 | 11/2001 |
| WO | WO 02/16680 A1 | 2/2002 |
| WO | WO 02/34986 A2 | 5/2002 |
| WO | WO 02/49535 A2 | 6/2002 |
| WO | WO 02/49536 A2 | 6/2002 |
| WO | WO 02/49678 A2 | 6/2002 |
| WO | WO 02/072937 A1 | 9/2002 |
| WO | WO 02/074189 A2 | 9/2002 |
| WO | WO 02/074191 A2 | 9/2002 |
| WO | WO 02/092339 A1 | 11/2002 |
| WO | WO 02/092888 A1 | 11/2002 |
| WO | WO 03/004735 A1 | 1/2003 |

* cited by examiner

Figure 1

BACKGROUND ART

ELECTROSPINNING OF FIBERS USING A ROTATABLE SPRAY HEAD

CROSS REFERENCE TO RELATED APPLICATIONS

This application is related to U.S. application Ser. No. 10/819,942, filed on Apr. 8, 2004, entitled "Electrospray/Electrospinning Apparatus and Method," the entire contents of which are incorporated herein by reference. This application is related to U.S. application Ser. No. 10/819,945, filed Apr. 8, 2004, entitled "Electrospinning in a Controlled Gaseous Environment," the entire contents of which are incorporated herein by reference.

DISCUSSION OF THE BACKGROUND

1. Field of the Invention

This invention relates to the field of electrospinning of fibers from polymer solutions.

2. Background of the Invention

Nanofibers are useful in a variety of fields from clothing industry to military applications. For example, in the biosubstance field, there is a strong interest in developing structures based on nanofibers that provide a scaffolding for tissue growth effectively supporting living cells. In the textile field, there is a strong interest in nanofibers because the nanofibers have a high surface area per unit mass that provides light but highly wear-resistant garments. As a class, carbon nanofibers are being used for example in reinforced composites, in heat management, and in reinforcement of elastomers. Many potential applications for nanofibers are being developed as the ability to manufacture and control the chemical and physical properties improves.

Electrospray/electrospinning techniques are used to form particles and fibers as small as one nanometer in a principal direction. The phenomenon of electrospray involves the formation of a droplet of polymer melt at an end of a needle, the electric charging of that droplet, and an expulsion of parts of the droplet because of the repulsive electric force due to the electric charges. In electrospraying, a solvent present in the parts of the droplet evaporates and small particles are formed but not fibers. The electrospinning technique is similar to the electrospray technique. However, in electrospinning and during the expulsion, fibers are formed from the liquid as the parts are expelled.

Glass fibers have existed in the sub-micron range for some time. Small micron diameter electrospun nanofibers have been manufactured and used commercially for air filtration applications for more than twenty years. Polymeric melt blown fibers have more recently been produced with diameters less than a micron. Several value-added non-woven applications, including filtration, barrier fabrics, wipes, personal care, medical and pharmaceutical applications may benefit from the interesting technical properties of commercially available nanofibers and nanofiber webs. Electrospun nanofibers have a dimension less than 1 µm in one direction and preferably a dimension less than 100 nm in this one direction. Nanofiber webs have typically been applied onto various substrates selected to provide appropriate mechanical properties and to provide complementary functionality to the nanofiber web. In the case of nanofiber filter media, substrates have been selected for pleating, filter fabrication, durability in use, and filter cleaning.

Figure 1:
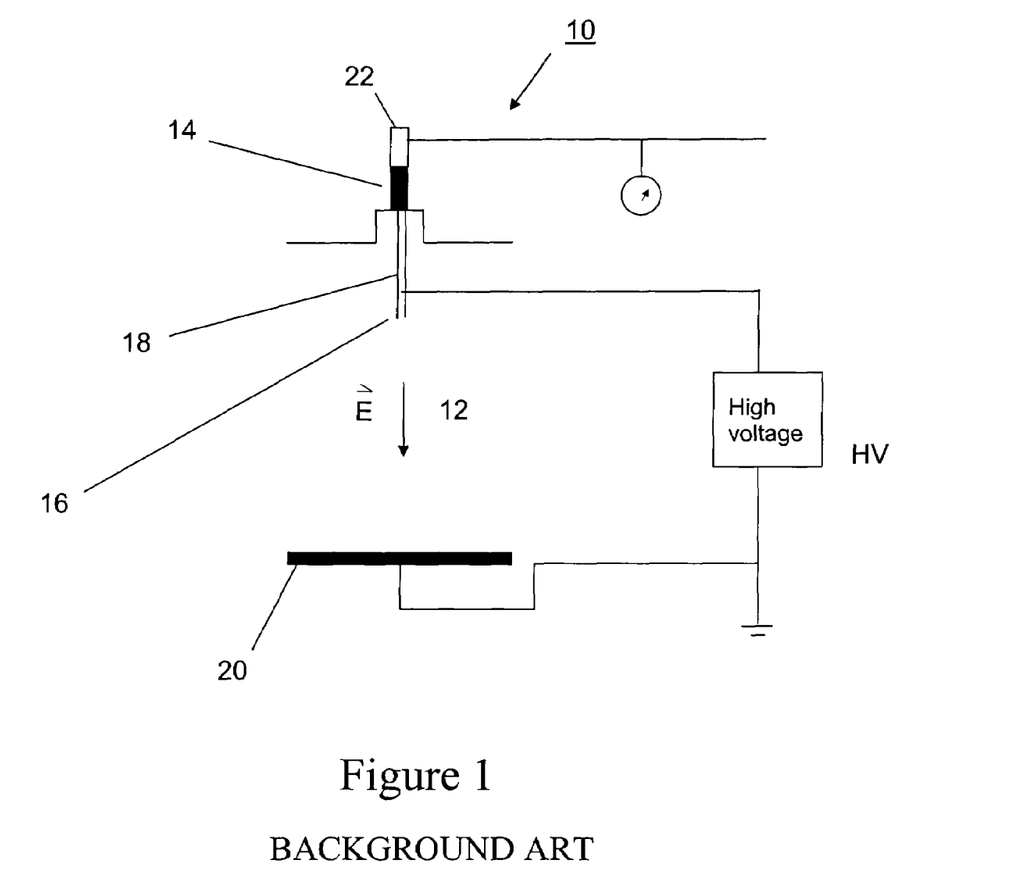
FIG. 1 is a schematic illustration of a conventional electrospray apparatus.

A basic electrospinning apparatus 10 is shown in FIG. 1 for the production of nanofibers. The apparatus 10 produces an electric field 12 that guides a polymer melt or solution 14 extruded from a tip 16 of a needle 18 to an electrode 20. An enclosure/syringe 22 stores the polymer solution 14. Conventionally, one end of a voltage source HV is electrically connected directly to the needle 18, and the other end of the voltage source HV is electrically connected to the electrode 20. The electric field 12 created between the tip 16 and the electrode 20 causes the polymer solution 14 to overcome cohesive forces that hold the polymer solution together. A jet of the polymer 14 is drawn from the tip 16 toward the electrode 20 by the electric field 12 (i.e. electric field extracted), and dries during flight from the needle 18 to the electrode 20 to form polymeric fibers. The fibers are typically collected downstream on the electrode 20.

The electrospinning process has been documented using a variety of polymers. One process of forming nanofibers is described for example in *Structure Formation in Polymeric Fibers*, by D. Salem, Hanser Publishers, 2001, the entire contents of which are incorporated herein by reference. By choosing a suitable polymer and solvent system, nanofibers with diameters less than 1 micron can be made.

Examples of fluids suitable for electrospraying and electrospinning include molten pitch, polymer solutions, polymer melts, polymers that are precursors to ceramics, and/or molten glassy substances. These polymers can include nylon, fluoropolymers, polyolefins, polyimides, polyesters, and other engineering polymers or textile forming polymers. A variety of fluids or substances besides those listed above have been used to make fibers including pure liquids, solutions of fibers, mixtures with small particles and biological polymers. A review and a list of the substances used to make fibers are described in U.S. Patent Application Publications U.S. 2002/0090725 A1 and U.S. 2002/0100725 A1, and in Huang et al., Composites Science and Technology, v63, 2003, the entire contents of which are incorporated herein by reference. U.S. Patent Application Publication No. U.S. 2002/0090725 A1 describes biological substances and bio-compatible substances to be electroprocessed, as well as solvents that can be used for these substances. U.S. Patent Application Publication No. U.S. 2002/0100725 A1 describes, besides the solvents and substances used for nanofibers, the difficulties of large scale production of the nanofibers including the volatilization of solvents in small spaces. Huang et al. give a partial list of substances/solvents that can be used to produce the nanofibers.

Further, U.S. Pat. No. 3,280,229, the entire contents of which are incorporated herein by reference, describes metal needles for electrospinning via single or multiple electrified needles. Alternatively, electrospinning can occur from a receptor having a narrow end through which the fluid can exit the receptor and a long pointed electrode immersed in the fluid to electrify the fluid. For example, U.S. Pat. No. 705,691, the entire contents of which are incorporated herein by reference, describes a simple spray head as described above.

Further, U.S. Patent Application Publication Nos. U.S. 2002/0007869A1, U.S. 2002/0090725A1, U.S. 2002/0100725A1, U.S. 2002/0122840A1, and U.S. 2002/0175449A1, the entire contents of which are incorporated herein by reference, describe a plurality of electrified needles used to increase a spray area for nanofiber production. These patent applications disclose methods by which a polymer fiber is distributed to a plurality of needles, the needles being connected to one or more conductive boards that have a high voltage. For example, U.S. Patent Application Publication No. U.S. 2002/0122840A1 shows an apparatus for electrospinning in which two conductor boards 26 and 30 make electrical contact to each needle 32. A high voltage is applied to each needle 32 through the conductor boards 26 and 30 that are in direct contact with the needles. Further, both U.S. Patent Publication Appl. No. 2002/0122840A1 and U.S. Pat. Publication Appl. No. U.S. 2002/0175449A1, describe electrospinning of polymer solutions through one or more charged conducting nozzles arranged on at least one conducting plate.

Hence, the background techniques using a multiplicity of individually electrified needles and/or a multiplicity of solution reservoirs are not conducive to large scale manufacturing. Recent application, U.S. Pat. Application Publication No. U.S. 2003/0106294 A1, the entire contents of which are incorporated herein by reference, describe an apparatus for electrospinning fibers utilizing a disc like spray head having multiple orifices being rotated about its center in which fibers are emitted from a face surface of the disk-like spray head. However, the emission of fibers from a face surface of a rotating spray head results in twisting and contorting of the extruded fibers due to the centripetal forces existing between the free end of the fiber and the end still attached to the extruding medium.

SUMMARY OF THE INVENTION

One object of the present invention is to provide an apparatus and a method for the electrospinning fibers conducive to mass production.

Another object is to provide an apparatus and a method which electrospins fibers in a parallel production process in which centrifugal forces supplement the electrospinning process.

Accordingly, a further object of the present invention is to provide an apparatus and a method which simultaneously electrospins a plurality of fibers onto a collection surface.

Thus, according to one embodiment of the present invention, there is provided a novel apparatus for electrospinning fibers which includes a spray head having a longitudinal axis and including at least one extrusion element disposed in a peripheral wall of the spray head. The extrusion element includes a passage by which a substance from which the fibers are to be electrospun is provided to a tip of the extrusion element. The extrusion element extends in a direction from the longitudinal axis and is configured to electrospin the fibers by electric field extraction of the substance from the tip of the extrusion element.

According to another embodiment of the present invention, there is provided a novel method for electrospinning fibers which provides a substance from which the fibers are to be composed to a tip of an extrusion element in a peripheral wall of a spray head having a longitudinal axis, rotates the spray head or a collector around the longitudinal axis, applies in a direction from the longitudinal axis of the spray head an electric field to the tip of the extrusion element to electrospin by electric field extraction the substance from the tip of the extrusion element to form the fibers, and collects the fibers on the collector.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2A:
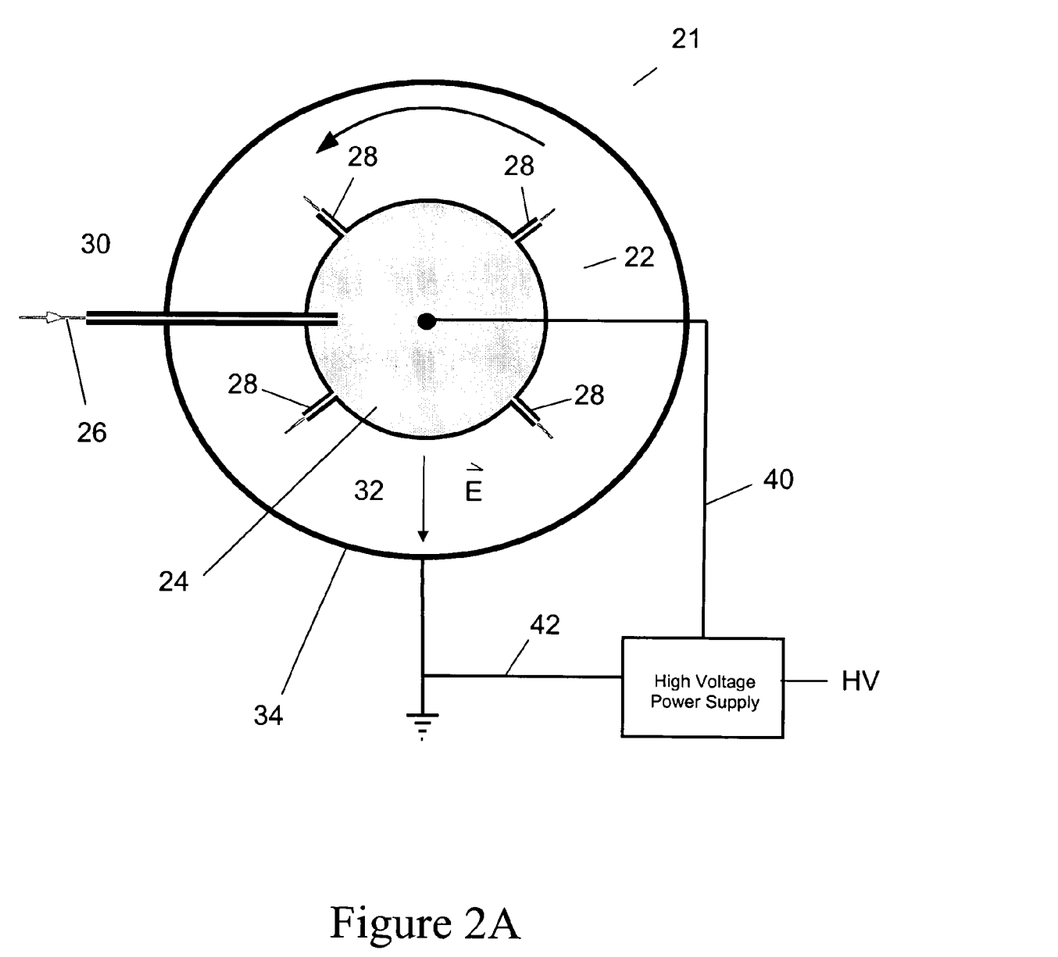
FIG. 2A is a schematic illustration showing a top view of one embodiment of an electrospinning apparatus of the present invention.
Figure 2B:
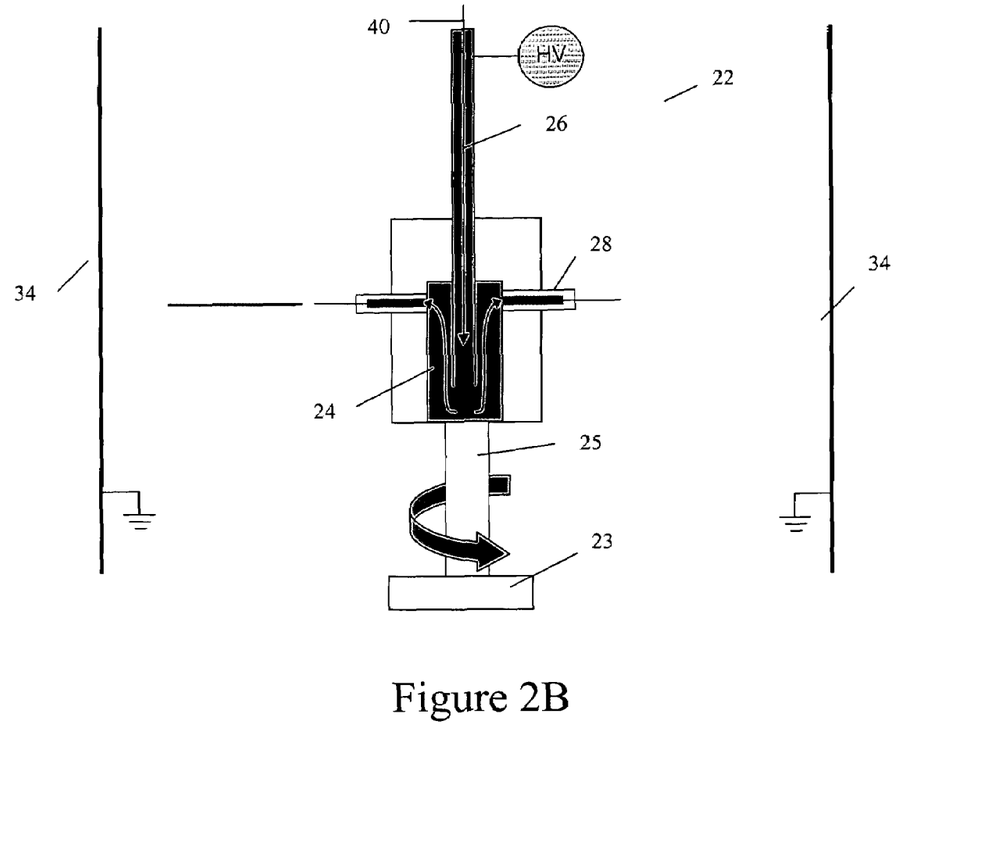
FIG. 2B is a schematic illustration showing a side view of the electrospinning apparatus of the present invention shown in FIG. 2A.

Referring now to the drawings, wherein like reference numerals designate identical, or corresponding parts throughout the several views, and more particularly to FIG. 2A, FIG. 2A is a schematic illustration showing a top view of an electrospinning apparatus 21 of one embodiment of the present invention in which a rotatable spray head 22 including a reservoir 24 holding a substance from which the fibers are to be extruded. FIG. 2B shows a side view of the electrospinning apparatus 21. In FIG. 2B, the electrospray medium is shown illustratively being feed to the reservoir 24 along an axial direction of the electrospinning apparatus 21. The electrospray medium 26 is electrospun from a plurality of extrusion (or electrospinning) elements 28 extending as shown in FIGS. 2A and 2B from the peripheral wall of the reservoir 24. The rotatable spray head 22 is preferably rotated about its center, and the spray of the electrospray medium 26 occurs radially from the extrusion elements 28 placed on the periphery of the rotatable spray head 22. The rotatable spray head 22 is preferably a cylindrical structure, but other structures such as for example polygonal structures are suitable. The rotatable spray head 22 includes a passage 30 for supplying the electrospray medium 26 to the reservoir 24.

An electric potential applied to the rotatable spray head 22 establishes an electric field 32 as shown in FIG. 2A which extends to a collector 34 constituting an opposite electrode. The geometrical arrangement of the rotatable spray head 22 and the collector 34 configures the electric field strength and distribution. An electric field strength of about 3 kV/cm in the present invention is preferred. In the present invention, the spray head 22 constitutes an electrifiable chamber (i.e., a chamber upon which an electric potential can be established). The electrospray medium 26 upon extraction from a tip of the plural extrusion elements 28 is guided along a direction of the electric field 32 toward the collector 34, but is deflected according to the centrifugal forces on the electrospun fibers.

The rotatable spray head 22, shown for example in FIG. 2A, can be a cylindrical vessel. On spinning, the electrospray medium 26 being a viscous solution is forced into the extrusion elements 28. The electric field 32 existing about the rotatable spray head 22 then extracts the electrospray medium 26 from the reservoir 24 to a tip end of the extrusion elements 28. The extracted medium 26 dries in the ambient about the rotatable spray head 22 to form fibers.

The electrospray medium 26 includes polymer solutions and/or melts known in the art for the extrusion of fibers including extrusions of nanofiber substances. Indeed, polymers and solvents suitable for the present invention include for example polystyrene in dimethylformamide or toluene, polycaprolactone in dimethylformamide/methylene chloride mixture (20/80 w/w), poly(ethyleneoxide) in distilled water, poly(acrylic acid) in distilled water, poly (methyl methacrylate) PMMA in acetone, cellulose acetate in acetone, polyacrylonitrile in dimethylformamide, polylactide in dichloromethane or dimethylformamide, and poly(vinylalcohol) in distilled water.

Upon extrusion from the rotatable spray head 22, the electrospun fibers collect on the collector 34. The collected fibers are deposited on the surface of the collector 34 with a degree of orientation dependent on the speed of rotation, the electric potential of the rotatable spray head 22, and the viscosity of the solution. According to the present invention, the fiber characteristics as well as the orientation can be controlled by the centrifugal forces generated by the spinning of the rotatable spray head 22 to be discussed below.

In one embodiment of the present invention, the rotatable spray head 22 preferably includes individual extrusion elements 28 such as for example capillaries, bundles of capillaries, needles, bundles of needles, tubes, bundles of tubes, rods, bundles of rods, concentric tubes, frits, open-cell foams, combinations thereof, or otherwise channels of appropriate shape formed in the wall of the rotatable spray head 22. The individual extrusion elements 28 can be made of metal, glass, or plastic capillary tubes appropriately sized to deliver the electrospray medium 26 from the reservoir 24 to an exterior of the extrusion elements 28, where the electrospray medium 26 is electrified. The individual extrusion elements 28 can be made of, for example, non-conducting substances such as glass, ceramic, Teflon, or polyethylene.

Further, the extrusion elements 28, in one embodiment of the present invention, as shown in FIG. 2A preferably extend beyond the wall of the rotatable spray head 22. However, the spray elements in another embodiment of the present invention may not extend beyond the wall of the rotatable spray head 22. Each extrusion element 28 has a first opening inside the wall of the rotatable spray head 22 and a second opening outside the wall of the rotatable spray head 22.

Figure 3A:
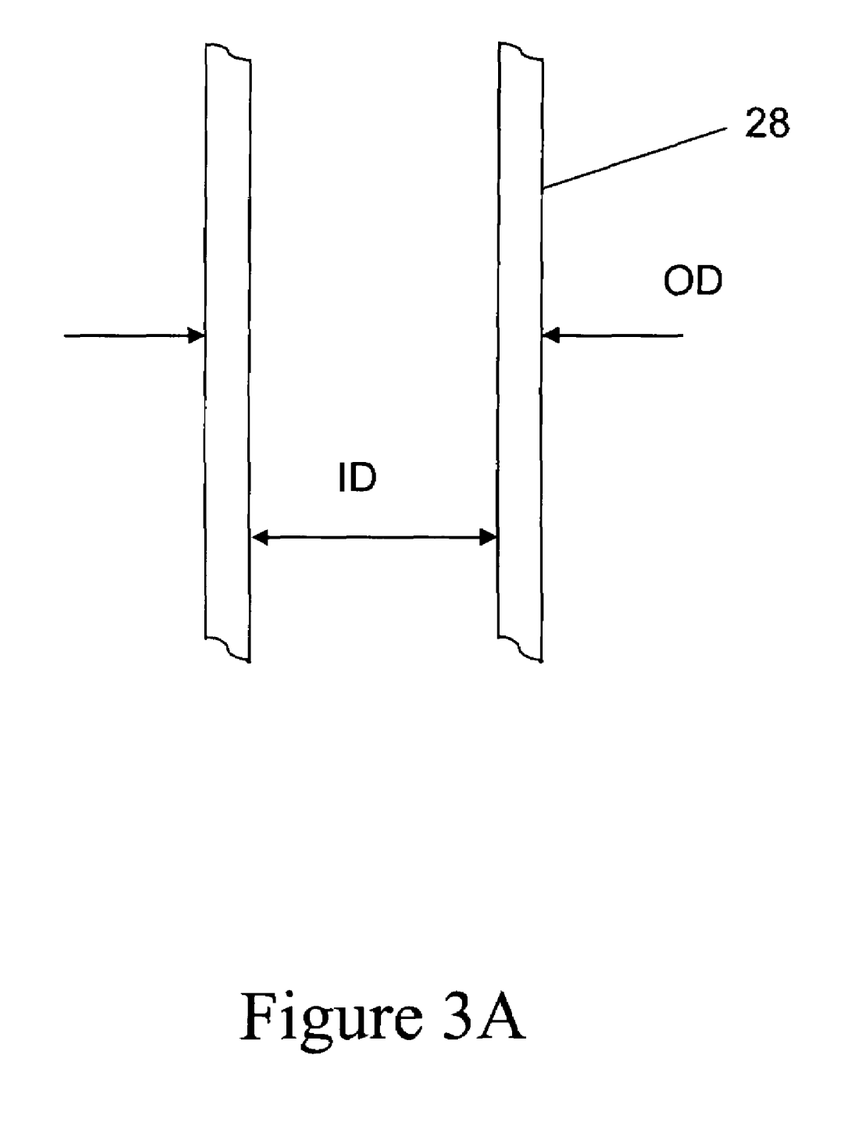
FIG. 3A is a schematic illustration of one embodiment of an extrusion element of the present invention.
Figure 3B:
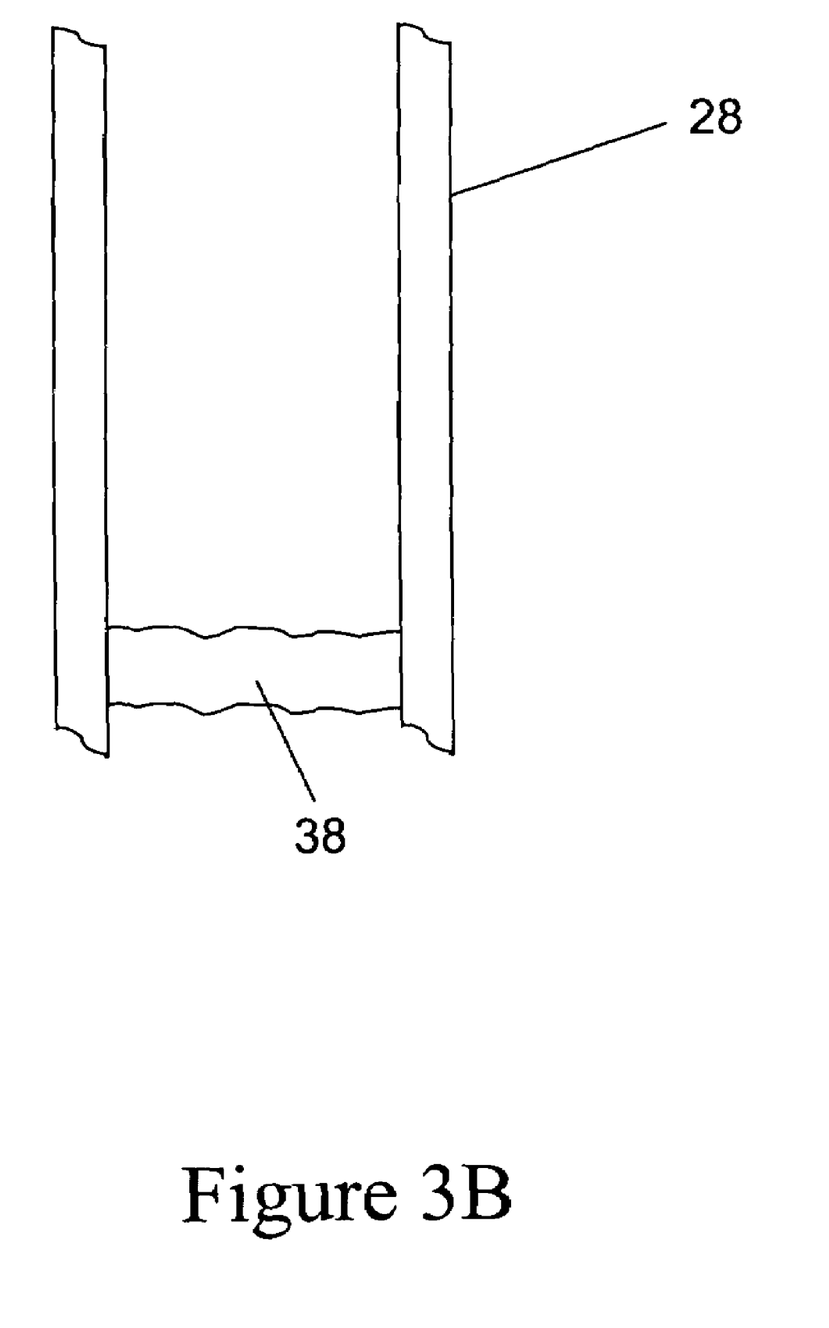
FIG. 3B is a schematic illustration of another embodiment of an extrusion element of the present invention.

FIG. 3A shows for example an extrusion element 28 which has an inner diameter ID between 50–250μm and an outer diameter OD about 260μm. Other cross-section shapes as for example a rectangular cross-section are also applicable for tubes, capillaries, needles, channels, etc. An inner dimension of 50 to 250 μm facilitates the electrospinning of nanofibers. Inner dimensions less than 400 μm for rectangular cross-sections are preferred. In another example, FIG. 3B shows the extrusion elements 28 having the form of a tube with a frit 38 covering an opening of the tube. A pump (not shown) maintains a supply of the electrospray medium 26 to the reservoir 24. The centrifugal force of the rotatable spray head 22 assists in forcing the electrospray medium 26 from the reservoir 24 into the extrusion elements 28. A filter can be placed between the pump and the reservoir 24 to filter out impurities and/or particles having a dimension larger than a predetermined dimension of one of the extrusion elements 28. A supply of the electrospray medium 26 to each extrusion element 28 is preferably balanced with the electric field strength responsible for extracting the substance from which the fibers are to be composed so that a droplet shape exiting the extrusion element 28 is maintained constant.

Generally, a smaller diameter tubes yield a narrower nanofiber. Also, while multiple tubes (spray heads) can be accommodated around the rotatable spray head 22, a certain minimum distance must be allowed between the adjacent tubes to avoid electrical interference between them. The minimum distance varies with one or more of the polymer/solvent system used, the electric field density, and the tube diameter. Tubes placed too close to each other can cause slower solvent removal rates affecting fiber quality.

The electric field 32 is produced between the rotatable spray head 22 and the collector by applying a high voltage power source HV, as shown in FIG. 2A. The high voltage power source HV can be commercial power source, such as for example Bertan Model 105–20R (Bertan, Valhalla, N.Y.) or for example Gamma High Voltage Research Model ES30P (Gamma High Voltage Research Inc., Ormond Beach, Fla.).

The high voltage source HV is connected to the rotatable spray head 22 through a lead 40 and to the collector 34 through another lead 42. The outside periphery of the rotatable spray head 22 is placed preferably 1 to 50 cm away from the collector 34. Typically, an electric field strength between 2,000 and 400,000 V/m is established by the high voltage source.

In one embodiment of the present invention, the collector 34 is grounded, and the fibers produced by electrospinning are directed by the electric field 32 toward the collector 34. The electrospun fibers are deposited on the collector 34, accumulate thereon, and are subsequently removed. A rotating mechanism (not shown) rotates the rotatable spray head 22 at a preset angular speed. A angular rotation speed of 1,000–10,000 rpm is preferred.

In one preferred embodiment of the present invention, the spray head 22 is made of a conducting substance such as for example aluminum or stainless steel. However, the spray head 22 may be made of an electric-field permeable substance and have an interior electrode, as described in the above-noted U.S. application Ser. No. 10/819,942, filed on April 8, 2004, entitled "Electrospray/Electrospinning Apparatus and Method," and incorporated herein by reference. Such a configuration is shown in FIG. 4.

Figure 4:
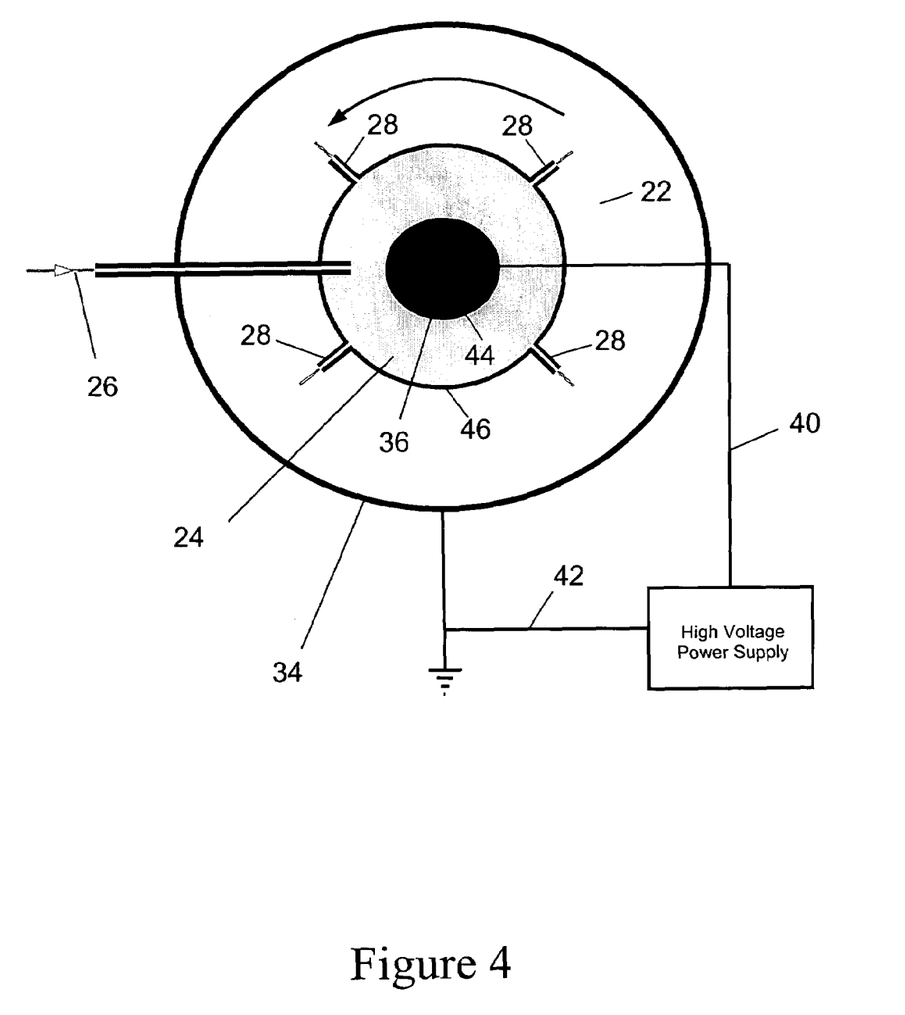
FIG. 4 is a schematic illustration showing a top view of another embodiment of an electrospinning apparatus of the present invention.

FIG. 4 is a schematic illustration showing a top view of an electrospinning apparatus of the present invention having an interior electrode 44 and an electric field permeable wall 46. As in the previous embodiment, the electrospray medium 26 being a viscous solution is forced into the extrusion elements 28 by rotation of the rotatable spray head 22. The electric field 32 existing about the rotatable spray head 22 then extracts the electrospray medium 26 from the tip end of the extrusion elements 28. The extracted medium 26 dries in the ambient about the rotatable spray head 22 to form fibers.

The distance between the collector 34 and the interior electrode 36 or the distance between the collector 34 and a periphery of the rotatable spray head 22 is determined based on a balance of a few factors such as for example a time for the solvent evaporation rate, the electric field strength, and a distance/time sufficient for a reduction of the fiber diameter.

These factors and their determination are similar in the present invention to those in conventional single needle spray elements. The present inventors have discovered that a rapid evaporation of the solvents results in larger than nm-size fiber diameters. Therefore, in one embodiment of the present invention, the evaporation of the solvent is controlled by control of the gaseous environment in the region about the extrusion elements 28 and in the region about where the fibers are being electrospun.

The present inventors have discovered that control of the gaseous environment about the extrusion elements 28 improves the process window available for the production of nanofibers. More specifically, the present inventors have discovered that the introduction into the gaseous environment about the extrusion elements of electronegative gases, ions, and energetic particles (as from radioisotopes) affects the electrospinning process. Further, control of the vapor pressure (and hence the drying rate) in the region in which the fibers are being electrospun improves the process window available for the production of nanofibers. Details of controlling the gaseous environment are described in more detail in related application U.S. Ser. No. 10/819,945, filed Apr. 8, 2004, entitled "Electrospinning in a Controlled Gaseous Environment,".

By appropriately controlling the gaseous environment surrounding the extrusion element 28, the present invention permits increases in the applied voltage and improved pulling of the liquid jet from the capillary. In particular, electronegative gases appear to reduce the onset of a corona discharge (which would disrupt the electrospinning process) around the capillary thus permitting operation at higher voltages enhancing the electrostatic force. Further, according to the present invention, electronegative gases reduce the possibility of bleeding-off charge in the Rayleigh instability region, thereby enhancing the stretching and drawing of the fiber.

Moreover, the drying rate for the electrospun fiber during the electrospinning process can be adjusted by altering the partial pressure of the liquid vapor in the gas surrounding the fiber. According to the present invention, retarding the drying rate is advantageous because the longer the residence time of the fiber in the region of instability the more prolonged is the stretching, and consequently the smaller the diameter of the resultant fiber. The height of the containment chamber and separation of the capillary at high DC voltage from the ground need, according to the present invention, to be compatible with the drying rate of the fiber.

As illustrative of the electrospinning process of the present invention, the following non-limiting examples are given to illustrate selection of the polymer, solvent, extrusion element to collection surface separation, solvent pump rate, and addition of electronegative gases. One illustrative example for selection, according to the present invention, of polymer, solvent, extrusion element, collection surface separation, solvent pump rate, and addition of electronegative gases is given below:

a rotatable spray head with an outside diameter of 20 mm;
a polymer solution of a molecular weight of 350 kg/mol,
a solvent of dimethylformamide DMF,
an extrusion element tip diameter of 500 µm,
a cylindrical collector screen,
~1.5 ml/hr pump rate providing the polymer solution,
an electronegative gas flow of $CO_2$ at 81 pm purging the environment about the rotatable spray head,
an electric field strength of 2 KV/cm,
a rotation speed of 1000 rpm, and
gap distance between the tip of the extrusion elements and the collector of 13 cm.

A decreased fiber size can be obtained by increasing the molecular weight of the polymer solution to 1000 kg/mol, and/or introducing a more electronegative gas (such as for example Freon), and/or increasing gas flow rate to for example 201 pm, and/or decreasing tip diameter to 150 µm (e.g., as with a Teflon tip).

Further, blended gases with different electrical properties can be used to according to the present invention. One example of a blended gas includes $CO_2$ (at 41 pm) blended with Argon (at 41 pm). Other examples of blended gases suitable for the present invention include, but are not limited to, $CO_2$ (41 pm) with Freon (4 1 pm), $CO_2$ (41 pm) with Nitrogen (41 pm), $CO_2$ (41 pm) with Air (41 pm), $CO_2$ (7 1 pm) with Argon (1 1 pm), $CO_2$ (11 pm) with Argon (71 pm).

Further, when a solvent such as methylene chloride or a blend of solvents is used to dissolve the polymer, the rate of evaporation of the solvent will depend on the vapor pressure gradient between the fiber and the surrounding gas. The rate of evaporation of the solvent can be controlled by altering the concentration of solvent vapor in the gas. The rate of evaporation affects the Rayleigh instability. In turn, the electrical properties of the solvent and its vapor influence the electrospinning process. For example, by maintaining a liquid solvent pool at the bottom of a chamber, the amount of solvent vapor present in the ambient about the electrospinning is controlled by altering temperature of chamber and/or pool, and thus controlling the partial pressure of solvent in the gaseous ambient about the electrospinning. Having a solvent vapor in the electrospinning chamber affects the drying rate of the fibers, and alters the fiber surface characteristics when a solvent other than the one used in spinning solution is used in the chamber.

Figure 5:
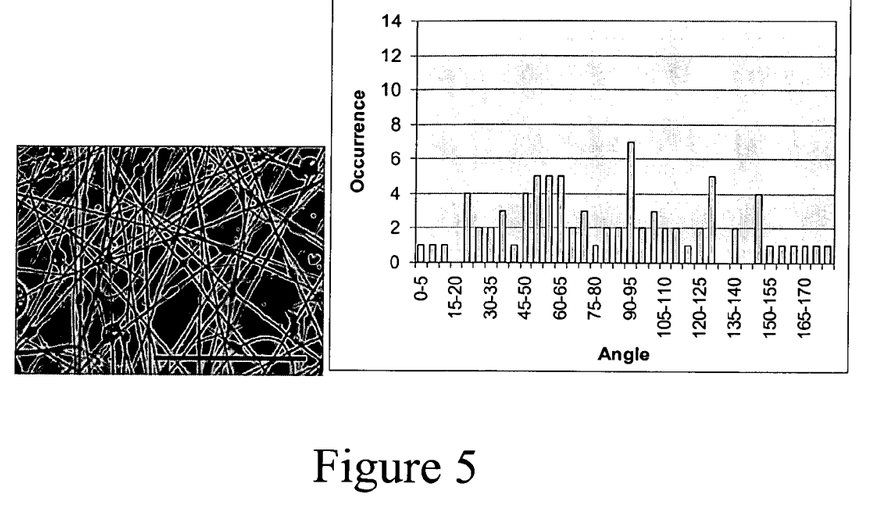
FIG. 5 is a replica of a fiber collection including an occurrence histogram produced by the electrospinning apparatus of the present invention with no angular rotation.
Figure 6:
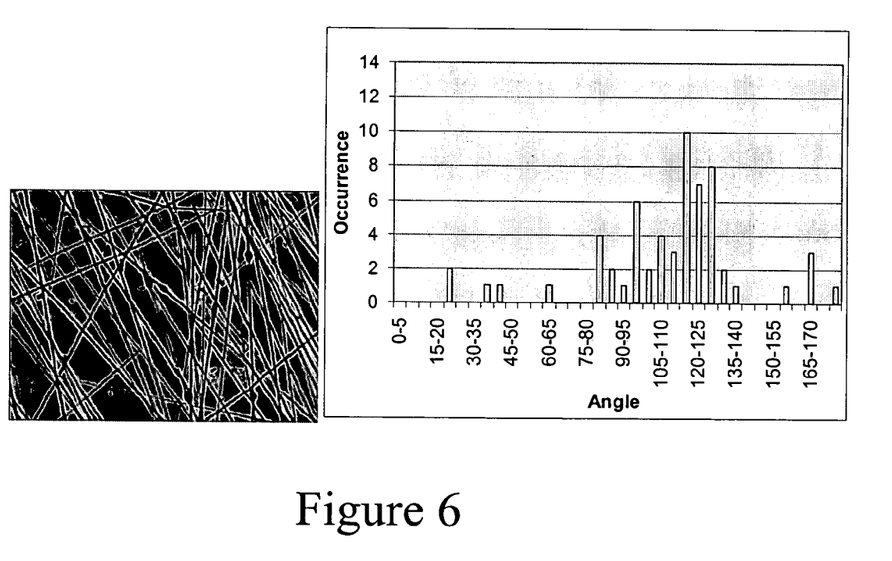
FIG. 6 is a replica of a fiber collection including an occurrence histogram produced by the electrospinning apparatus of the present invention at an angular rotation speed of 150 rpm.
Figure 7:
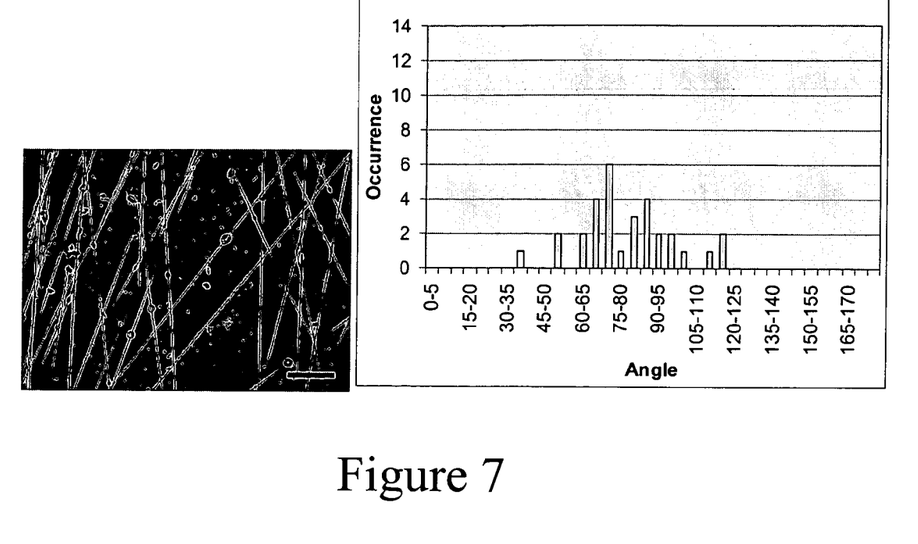
FIG. 7 is a replica of a fiber collection including an occurrence histogram produced by the electrospinning apparatus of the present invention at an angular rotation speed of 350 rpm.
Figure 8:
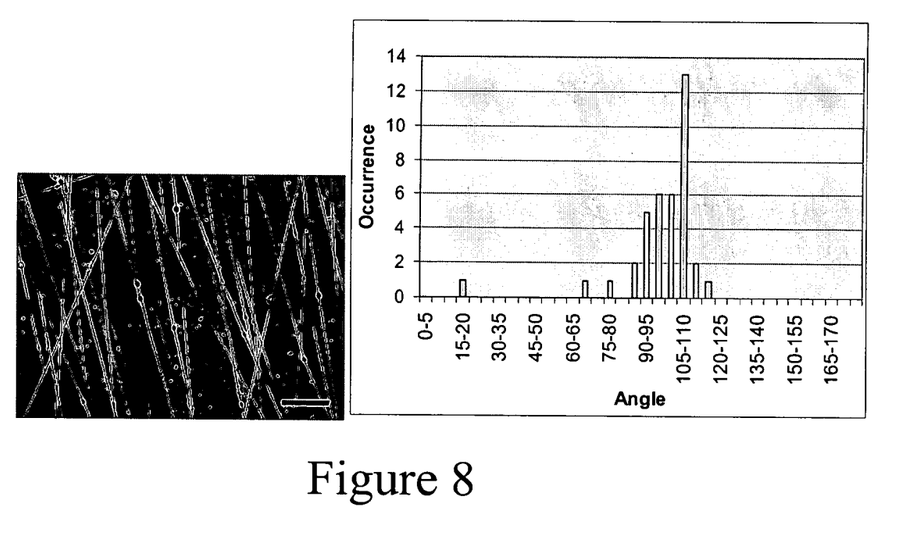
FIG. 8 is a replica of a fiber collection including an occurrence histogram produced by the electrospinning apparatus of the present invention at an angular rotation speed of 600 rpm.
Figure 9:
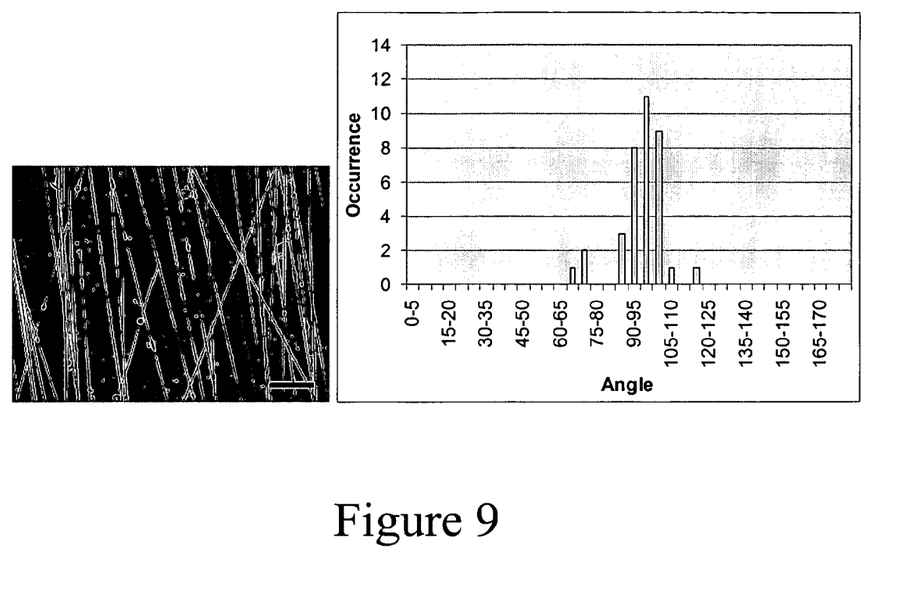
FIG. 9 is a replica of a fiber collection including an occurrence histogram produced by the electrospinning apparatus of the present invention at an angular rotation speed of 950 rpm.

Further, the present inventors have discovered that the rotational speed of the spray head 22 produces a fiber collection with preferential orientations. For example, the rotatable spray head (e.g., the rotatable spray head referenced above having an outer diameter of 20 mm) when spun at higher angular speeds increases a preferred orientation of the deposited fibers. Indeed, FIG. 5 depicts a replica of a fiber collection including an occurrence histogram produced by the electrospinning apparatus of the present invention with no angular rotation. The occurrence histogram indicates that with no angular rotation the standard deviation of the deposited fibers is 44° relative to a vertical direction (i.e., relative to an angle of 90° on the constructed histogram). FIG. 6 is a replica of a fiber collection including an occurrence histogram produced by the electrospinning apparatus of the present invention when rotated at an angular rotation speed of 150 rpm. The occurrence histogram indicates that with the angular rotation speed of 150 rpm the standard deviation of the deposited fibers is reduced to 30°. FIGS. 7–9 are replicas of fiber collections and occurrence histograms produced by the electrospinning apparatus of the present invention when rotated at higher angular rotation speeds of 350, 600, and 950 rpm, respectively. The occurrence histograms indicate that, with the increased angular rotation speed, the standard deviation of the deposited fibers is further reduced yielding at an angular rotation speed of 950 rpm a standard deviation of less than 10°. As shown in FIG. 9, a majority of the deposited fibers are aligned.

As shown in FIGS. 5–9, the present invention provides a fiber collection in which the fibers overlay each other. The fibers in the collection due to deposition under the above-noted centrifugal acceleration are preferentially oriented along a longitudinal axis of the mat. Indeed, FIGS. 6–9 show that the fibers are oriented with a principal axis of a majority of the fibers lying on average along the longitudinal axis. The degree of orientation can be such that a majority of the fibers lie within 30° of the longitudinal axis, as in FIG. 8. Under higher speed rotations, a majority of the fibers lie within 10° of the longitudinal axis, as in FIG. 9.

In the present invention, the centrifugal force of the angular rotation adds to the force applied by the pump, helping the fluid to exit the extrusion element tips. Additionally, the centrifugal force helps to overcome the surface tension forces to aid in jet formation. Orientation of the randomly whipping fiber can be achieved at rotation speeds that are higher than the whipping speeds of the fiber, such improvements in the orientation being illustrated by FIGS. 6–9.

Accordingly, a translation mechanism in the present invention can rotate the spray head and/or the collector. FIG. 2B shows a rotary mechanism 23 connected in that instance to the rotatable spray head 22. The rotary mechanism 23 can be any suitable drive by which the rotatable spray head can be rotated. For example, the rotary mechanism 23 can be a motor with a belt or gear drive driving a rotation shaft 25 connected to the rotatable spray head 22. The rotary mechanism 23 can be an electric motor in which the rotor of the motor is directly coupled to the rotation shaft 25. Other drive mechanisms known in the art are likewise applicable provided these drive mechanisms permit the prescribed rotational speeds to be obtained. Accordingly, the rotary mechanism 23 can be also coupled to the collector 34 to drive the collector 34 at a prescribed angular speed.

By rotating the spray head as discussed in relation to FIGS. 2A and 2B, a centrifugal force exists on the electrospun fibers aiding in the development of a fiber collection having a preferred orientation. Indeed, a preferred embodiment of the present invention includes an apparatus for producing fibers which has a spray head having a reservoir configured to hold a substance from which the fibers are to be composed, and has plural extrusion elements provided in a peripheral wall of the spray head so as to communicate the substance from the reservoir. The spray head in this embodiment is configured to electrospin the substance from the plural extrusion elements to form the fibers.

While the present invention can be implemented using the structural configuration shown in FIGS. 2A and 2B, in another embodiment of the present invention, the collector can be rotated alone or in an opposite fashion to the spray head.

In this embodiment, the collector can be a conveyor configured to convey a belt in an opposite direction to the tip of a stationary or a counter-rotating extrusion element. The conveyor by translating the belt circumferentially about the spray head can produce on the belt deposited oriented fibers. In the present invention, rotation of the collector at the angular speed given previously for the spray head yields oriented fibers even if the spray head is stationary. In this case, the collector rotates or otherwise travels in a circumferential direction to collect the oriented fibers, and by making multiple passes permits a fiber collection to be deposited.

As described, the present invention provides various apparatuses and methods for producing fibers. In general, the apparatus includes a spray head supported on a longitudinal axis and including at least one extrusion element disposed in a peripheral wall of the spray head. The extrusion element includes a passage by which a substance from which the fibers are to be composed is provided to a tip of the extrusion element. The extrusion element extends in a direction from the longitudinal axis and is configured to electrospin the fibers by electric field extraction of the substance from the tip of the extrusion element.

Figure 10:
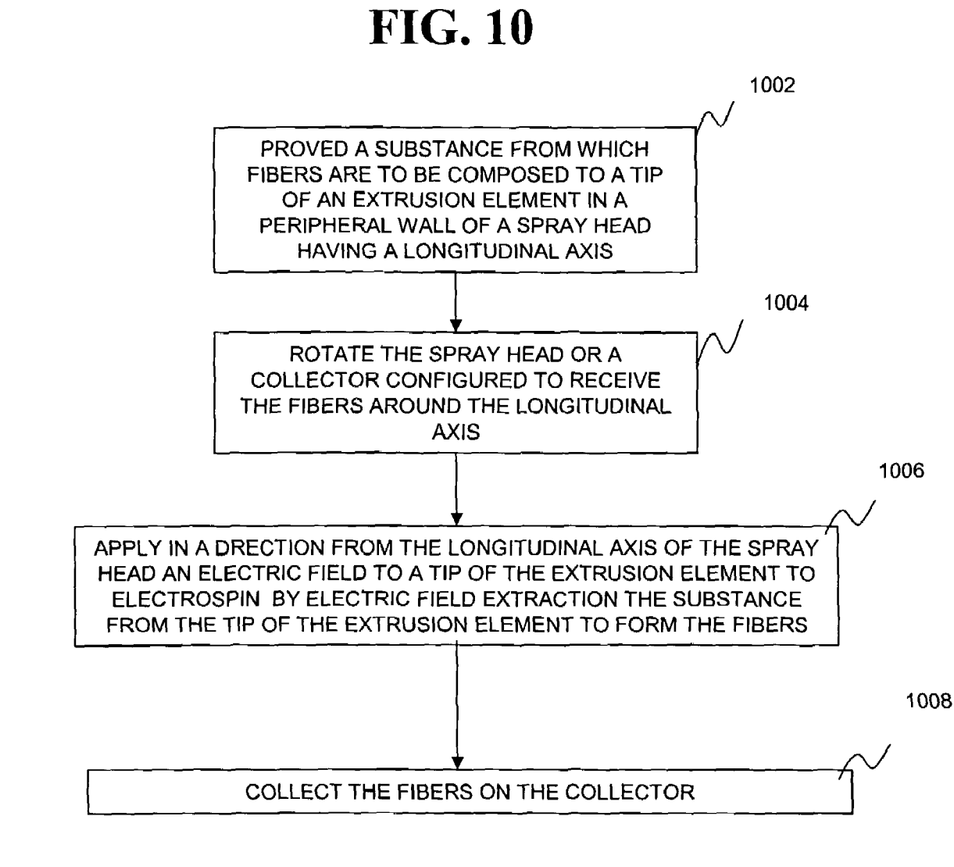
FIG. 10 is a flowchart depicting a method of the present invention.

Similarly, as shown in FIG. 10 in step 1002, one method of the present invention provides a substance from which the fibers are to be composed to a tip of an extrusion element in a peripheral wall of a spray head having a longitudinal axis. In step 1004, the method rotates the spray head or a collector configured to receive the fibers around the longitudinal axis. In step 1006, the method applies in a direction from the longitudinal axis of the spray head an electric field to the tip of the extrusion element to electrospin by electric field extraction the substance from the tip of the extrusion element to form the fibers. In step 1008, the method collects the fibers on the collector.

In step 1004, the spray head and the collector are preferably rotated at different and/or opposite angular velocities in a range of 1,000–10,000 rpm. In step 1006, the electrospinning electrospins the extruded substance to form fibers or nanofibers. In step 1006, the electrospinning occurs preferably in an electric field strength of 2,000–400,000 V/m. In step 1008, the fibers can be collected on a grounded collector. The electrospinning can produce either fibers or nanofibers.

The fibers and nanofibers produced by the present invention include, but are not limited to, acrylonitrile/butadiene copolymer, cellulose, cellulose acetate, chitosan, collagen, DNA, fibrinogen, fibronectin, nylon, poly(acrylic acid), poly(chloro styrene), poly(dimethyl siloxane), poly(ether imide), poly(ether sulfone), poly(ethyl acrylate), poly(ethyl vinyl acetate), poly(ethyl-co-vinyl acetate), poly(ethylene oxide), poly(ethylene terephthalate), poly(lactic acid-co-glycolic acid), poly(methacrylic acid) salt, poly(methyl methacrylate), poly(methyl styrene), poly(styrene sulfonic acid) salt, poly(styrene sulfonyl fluoride), poly(styrene-co-acrylonitrile), poly(styrene-co-butadiene), poly(styrene-co-divinyl benzene), poly(vinyl acetate), poly(vinyl alcohol), poly(vinyl chloride), poly(vinylidene fluoride), polyacrylamide, polyacrylonitrile, polyamide, polyaniline, polybenzimidazole, polycaprolactone, polycarbonate, poly(dimethylsiloxane-co-polyethyleneoxide), poly(etheretherketone), polyethylene, polyethyleneimine, polyimide, polyisoprene, polylactide, polypropylene, polystyrene, polysulfone, polyurethane, poly(vinylpyrrolidone), proteins, SEBS copolymer, silk, and styrene/isoprene copolymer.

Additionally, polymer blends can also be produced as long as the two or more polymers are soluble in a common solvent. A few examples would be: poly(vinylidene fluoride)-blend-poly(methyl methacrylate), polystyrene-blend-poly(vinylmethylether), poly(methyl methacrylate)-blend-poly(ethyleneoxide), poly(hydroxypropyl methacrylate)-blend poly(vinylpyrrolidone), poly(hydroxybutyrate)-blend-poly(ethylene oxide), protein blend-polyethyleneoxide, polylactide-blend-polyvinylpyrrolidone, polystyrene-blend-polyester, polyester-blend-poly(hyroxyethyl methacrylate), poly(ethylene oxide)-blend poly(methyl methacrylate), poly(hydroxystyrene)-blend-poly(ethylene oxide)).

By post treatment annealing, carbon fibers can be obtained from the electrospun polymer fibers.

Numerous modifications and variations of the present invention are possible in light of the above teachings. It is therefore to be understood that within the scope of the appended claims, the invention may be practiced otherwise than as specifically described herein.

The invention claimed is:

1. An apparatus for producing fibers, comprising:
a spray head having a longitudinal axis and including,
at least one electrospinning element having a tip, said tip extending in a radial direction from a peripheral wall of the spray head, said peripheral wall encircling the longitudinal axis, said electrospinning element having a passage by which a substance from which the fibers are to be composed is provided to an interior of the tip of the electrospinning element, and
said electrospinning element configured to electrospin said fibers by electric field extraction of the substance from the tip of the electrospinning element.

2. The apparatus of claim 1, further comprising:
a collector configured to receive said fibers from the spray head.

3. The apparatus of claim 2, further comprising:
a rotary mechanism configured to rotate at least one of the spray head and the collector around the longitudinal axis.

4. The apparatus of claim 3, wherein the rotary mechanism is configured to rotate both the spray head and the collector at different angular speeds.

5. The apparatus of claim 3, wherein the rotary mechanism is configured to rotate in opposite angular directions both the spray head and the collector.

6. The apparatus of claim 3, wherein said spray head comprises:
a rotatable spray head configured to rotate about the longitudinal axis.

7. The apparatus of claim 6, wherein said rotatable spray head comprises:
at least one of a cylindrical or polygonal structure.

8. The apparatus of claim 6, wherein said rotatable spray head is configured to rotate at an angular speed of 150–10,000 rpm.

9. The apparatus of claim 3, wherein said collector comprises a rotatable collector configured to rotate about the longitudinal axis.

10. The apparatus of claim 9, wherein said rotatable collector is configured to rotate at an angular speed of 150–10,000 rpm.

11. The apparatus of claim 6, wherein the at least one electrospinning element comprises:
plural electrospinning elements disposed equidistant along said peripheral wall.

12. The apparatus of claim 11, wherein said plural electrospinning elements define openings through the peripheral wall having an inner dimension in a range of 50–250 μm.

13. The apparatus of claim 11, wherein said plural electrospinning elements comprise tubes.

14. The apparatus of claim 13, wherein one of said tubes has an interior cross sectional area of 1900–50,000 μm$^2$.

15. The apparatus of claim 13, wherein one of said tubes has an outer dimension of less than 400 μm.

16. The apparatus of claim 11, wherein said plural electrospinning elements comprise at least one of capillaries, frits, needles, and foams.

17. The apparatus of claim 11, wherein at least one of said plural electrospinning elements extends past said peripheral wall of said rotatable spray head.

18. The apparatus of claim 11, wherein at least one of said plural electrospinning elements comprises a metallic member.

19. The apparatus of claim 11, wherein at least one of said plural electrospinning elements comprises an insulating member.

20. The apparatus of claim 1, wherein said spray head comprises:
a reservoir configured to hold the substance from which the fibers are to be composed.

21. The apparatus of claim 1, wherein said spray head comprises:
an electrically permeable vessel including a reservoir configured to hold the substance from which the fibers are to be composed; and
an interior electrode located inside said vessel.

22. The apparatus of claim 21, wherein said electrically permeable vessel comprises an insulator.

23. The apparatus of claim 21, wherein said electrically permeable substance comprises at least one of a rubber and a plastic substance.

24. The apparatus of claim 2, wherein said collector is circumferentially disposed about the spray head.

25. The apparatus of claim 2, wherein said collector is at a ground potential.

26. The apparatus of claim 2, wherein the spray head and the collector are maintained at opposite electric potentials.

27. The apparatus of claim 2, wherein said collector comprises at least one of a plate and a screen.

28. The apparatus of claim 2, wherein said collector is separated 1–50 cm from said spray head.

29. The apparatus of claim 2, further comprising:
a power source electrically connected between said spray head and said collector to generate an electric field between said spray head and said collector.

30. The apparatus of claim 29, wherein said power source is configured to generate an electric field strength of 2,000–400,000 V/m between said spray head and said collector.

31. A system for producing fibers, comprising:
a spray head having a longitudinal axis and including,
at least one-electrospinning element having a tip, said tip extending in a radial direction from a peripheral wall of the spray head, said peripheral wall encircling the longitudinal axis,
said electrospinning element having a passage by which a substance from which the fibers are to be composed is provided to an interior of the tip of the electrospinning element, and
said electrospinning element extending from the peripheral wall in a direction from the longitudinal axis in the radial direction and configured to electrospin said fibers by electric field extraction of the substance from the tip of the electrospinning element;
a collector configured to collect said fibers; and
a rotary mechanism configured to rotate at least one of the spray head and the collector.

32. The system of claim 31, wherein the rotary mechanism is configured to rotate both the spray head and the collector at different angular speeds.

33. The system of claim 31, wherein the rotary mechanism is configured to rotate in opposite angular directions both the spray head and the collector.

34. The system of claim 31, wherein said at least one electrospinning element defines an opening through the peripheral wall having an inner dimension in a range of less than 400 µm.

35. The system of claim 31, further comprising:

a power supply configured to establish an electric field between the spray head and the collector.

36. The system of claim 35, wherein said power supply is configured to produce said electric field having an electric field strength of 2,000–400,000 V/m.

37. The apparatus of claim 1, wherein the spray head comprises a rotatable spray head.

38. The apparatus of claim 2, wherein the collector is configured to encircle the longitudinal axis and to extend in a direction of the longitudinal axis.

39. The system of claim 31, wherein the spray head comprises a rotatable spray head.

40. The system of claim 31, wherein the collector is configured to encircle the longitudinal axis and to extend in a direction of the longitudinal axis.

* * * * *